United States Patent Office

2,952,660

THERMAL STABILIZATION OF HALOETHYLENE POLYMERS

Carl B. Havens, Midland, Mich., assignor to The Dow Chemical Company, Midland, Mich., a corporation of Delaware No Drawing. Filed Dec. 24, 1958, Ser. No. 782,629

2 Claims. (Cl. 260—45.7)

This invention relates to the thermal stabilization of haloethylene polymers. More particularly it relates to new compositions based on haloethylene polymers having improved thermal stability over the prior known compositions.

This application is a continuation-in-part of U.S. Serial No. 626,832, filed December 7, 1956, now U.S. Patent No. 2,889,650.

It is known that haloethylene polymers, such as polyvinyl chloride and the copolymers of vinyl chloride and vinylidene chloride, undergo appreciable degradation and darkening when heated during thermal fabrication operations and when the fabricated articles are exposed for prolonged periods to elevated temperatures. Such thermal sensitivity has seriously limited the applications in which haloethylene polymers may be employed. One of the common means for alleviating that degradation has been to employ certain additives as heat stabilizers in the polymer formulations. Those additives have consisted commonly of inorganic salts, such as tetrasodium pyrophosphate, which frequently were incompatible with the polymer prohibiting the production of transparent articles, were high melting causing slubs in the articles and lower fabrication efficiencies, and were hygroscopic causing gassing during fabrication. Other heat stabilizers that were employed were organo-metallic compounds which were expensive and difficult to prepare and in some instances caused degradation of the plasticizers used in the formulation. The requirements of a suitable heat stabilizer can be seen to be manifold and varied. It must be compatible with and inert to all elements of the formulation. It must be odor-free or if a slight odor is present, it must not be unpleasant. Further it should not impart a color to the formulation. It is desirable that it be non-toxic, tasteless, and insoluble in water and the common solvents. In view of those many requirements, it is impossible for an investigator to predict with any degree of certainty the effectiveness of any particular compound as a stabilizer and continuous search is being made for new and more effective heat stabilizers.

It is accordingly an object of this invention to provide a novel heat stabilized composition based upon haloethylene polymers.

It is a further object to provide such compositions which are thermally stabilized with metal free organic stabilizers.

The above and related objects are achieved with a composition comprising a haloethylene polymer and stabilizing quantities of certain alicyclic compounds selected from the group consisting of substituted cyclopropane and substituted cyclobutane as will be later described.

Any polymer containing halide groups pendant from the carbon chain may be stabilized with alicyclic compounds of this invention. As typical examples may be mentioned the polymers of vinyl chloride and of vinylidene chloride and the copolymers of vinyl chloride and vinylidene chloride with each other or with another monoethylenically unsaturated monomer, such as acrylonitrile and vinyl acetate. The copolymers consisting predominantly, i.e. at least 50 percent by weight of vinylidene chloride are particularly sensitive to thermal exposure and are accordingly preferred in these compositions.

The stabilizers useful in the compositions of this invention are those having a parent nucleus of cyclopropane or cyclobutane. The alicyclic compounds may be substituted with any organic substituents which are inert to all of the elements of the polymer formulation. Exemplary of such substituents are alkyl, aryl, acyl, carboxyl, carboxylic ester groups where the ester may be composed of alkyl groups having from 1 to 8 carbon atoms, phenyl, or substituted phenyl. A typical member of useful stabilizers falling within the scope of the invention is: cyclohexyl-1, 3-diphenyl-1, 3-dimethyl cyclobutane.

The compounds are easily prepared by known reactions such as by the action of sodium on 1,3-dibromides or by other known reactions such as are described in Richter, V.v., "Chemistry of the Carbon Compounds," Nordeman Publishing Company, New York,, vol. II, pages 25 ff. (1939). In a typical preparation the method by which the above-mentioned compound was prepared will be described. In a vessel were placed 36.2 parts by weight of α-methylstyrene and 1.8 parts by weight of an acid activated clay, sold as Retrol by the Filtro Corporation. This clay had the following analysis: $SiO_2$, 55.8 percent; $TiO_2$, 0.55 percent; $Al_2O_3$, 15.6 percent; $Fe_1O_2$, 2.37 percent; MnO, .02 percent; MgO, 2.61 percent; CaO, 0.87 percent; $Na_2O$, 0.04 percent; $P_2O_5$, 0.05 percent and $SO_3$, 0.67 percent. These materials were heated slowly with stirring for 8 minutes wherein the maximum temperature attained was 180° C. The reactants were then cooled with water to stop further reaction. The mixture was filtered and fractionated in a Vigreus column. The cut boiling at 181° to 185° C. was collected. This material had a melting point of 47.5° C. The percent yield of the 1,3-dimethyl, 1,3-diphenyl cyclobutane was 79 percent. 708 parts by weight of this product were placed with 492 parts by weight of cyclohexene and 100 parts by weight of Retrol. The reactants were placed in a bomb and heated at about 205° C. for about one hour. The maximum pressure attained was 60 pounds per square inch. The material was cooled and filtered and finally distilled at 20 millimeters mercury using a Vigreux column. The cyclohexyl, 1,3-dimethyl, 1,3-diphenyl cyclobutane was obtained in a yield of 78 percent.

The alicyclic compounds of this invention show stabilizing effectiveness when used in an amount of from 1 to 10 percent of the weight of the polymer. It is preferred, however, to employ them in an amount of from 2 to 5 percent. When more than 5 percent is used, the stabilizers become economically unattractive, no additional benefits accrue, and the physical properties of articles made from the composition suffer.

The stabilizers may be employed with the other common additives used in haloethylene polymer formulations without any adverse effects resulting therefrom. Typical of such additives are light stabilizers, fillers, pigments, and dyes.

Because of their completely organic nature the alicyclic compounds are capable of greater compatibility with the polymers than the inorganic and organo-metallic stabilizers heretofore used. In addition the alicyclic compounds are but very lightly colored so that pastel colored articles may be produced.

The compounds may be incorporated into the polymer formulation by any known blending technique. Because of their nature they may also be mixed with the monomer prior to polymerization to produce thermally stable polymers.

The effectiveness and advantages of the alicyclic compounds of this invention will be more apparent from the following illustrative examples wherein all parts and percentages are by weight.

Example 1

A sample composition was prepared by blending 90 parts of a copolymer prepared from 85 percent vinylidene chloride and 15 percent vinyl chloride with 10 parts of cyclohexyl-1, 3-diphenyl-1, 3-dimethyl cyclobutane. A second sample contained no stabilizer and was used for purposes of comparison. The samples were each evaluated according to a standard test. In that test a sample of at least 20 grams of the formulation is subjected to a temperature of 178° C. and the pressure of the evolved hydrohalide gas used to determine the degree of thermal degradation. The results are relative to a standard and are reported as "T" values, which are the times required for the samples to reach an arbitrary rate of pressure rise. Thus, a more thermally stable composition will have a higher "T" value than a less stable composition. When evaluated in this test the composition of this invention was found to have a "T" value of 10 and the unstabilized composition had a value of 8.5.

Example 2

A thermally stable copolymer was prepared by dissolving 2 percent of cyclohexyl-1, 3-diphenyl-1, 3-dimethyl cyclobutane in comonomers composed of 85 percent vinylidene chloride and 15 percent vinyl chloride. The comonomers were then dispersed in an aqueous phase containing 0.2 percent hydroxypropyl cellulose dissolved therein and the dispersion subjected to thermal and catalytic conditions known to cause polymerization. Following polymerization the copolymer was filtered, washed, and again filtered before drying. The color of the dried polymer was a light tan and after exposure at 140° C. for four hours was a tan.

By the way of contrast when the copolymer was prepared in the same way but without any stabilizer, the color of unexposed polymer was a light tan but after exposure at 140° C. for four hours was very dark brown.

Similar results are obtained when the alicyclic compounds are employed as stabilizers for the polymers and copolymers containing predominant amounts of vinyl chloride.

What is claimed is:

1. A thermally stable composition comprising a resinous chloroethylene polymer and from 1 to 10 percent by weight of said chloroethylene polymer of cyclohexyl-1, 3-diphenyl-1, 3- dimethyl cyclobutane.

2. The composition claimed in claim 1, wherein said resinous chloroethylene polymer is a copolymer composed predominantly of vinylidene chloride with the remainder being a copolymerizable monoethylenically unsaturated monomer.

References Cited in the file of this patent

UNITED STATES PATENTS 2,310,971      Lincoln et al. _____ Feb. 16, 1943